US006654685B2

(12) United States Patent
McIntyre (10) Patent No.: US 6,654,685 B2
(45) Date of Patent: Nov. 25, 2003

(54) APPARATUS AND METHOD FOR NAVIGATION OF AN AIRCRAFT

(75) Inventor: Melville Duncan W. McIntyre, Bellevue, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/037,401

(22) Filed: Jan. 4, 2002

(65) Prior Publication Data

US 2003/0130791 A1 Jul. 10, 2003

(51) Int. Cl.[7] .............................. G01S 5/02; H04B 7/185
(52) U.S. Cl. .................... 701/213; 701/220; 340/545.5; 244/3.2; 244/79; 79/76; 73/78
(58) Field of Search ................................ 701/213, 214, 701/207, 220, 216; 342/357.14, 357.12, 358, 357.01, 357.05, 357.06, 450, 451, 352; 340/990, 994, 995, 961, 545.5, 436, 945, 947; 244/3.2, 79; 79/76; 73/78

(56) References Cited

U.S. PATENT DOCUMENTS

| 5,617,317 A | * | 4/1997 | Ignagni ....................... 342/357 |
| 5,657,025 A | | 8/1997 | Ebner et al. ................ 342/357 |
| 5,719,764 A | | 2/1998 | McClary | |
| 5,923,286 A | * | 7/1999 | Divakaruni .................. 342/357 |
| 6,088,653 A | | 7/2000 | Sheikh et al. ............... 701/214 |
| 6,163,021 A | * | 12/2000 | Mickelson .................. 244/3.2 |
| 6,167,347 A | | 12/2000 | Lin ............................ 701/214 |
| 6,246,960 B1 | * | 6/2001 | Lin ............................ 701/214 |
| 6,292,750 B1 | * | 9/2001 | Lin ............................ 701/214 |
| 6,317,688 B1 | * | 11/2001 | Bruckner et al. ........... 701/213 |
| 6,449,559 B2 | * | 9/2002 | Lin ............................ 701/216 |
| 6,480,789 B2 | | 11/2002 | Lin | |
| 2002/0126044 A1 | * | 9/2002 | Gustafson et al. ..... 342/357.12 |
| 2002/0169553 A1 | * | 11/2002 | Perlmutter et al. ......... 701/214 |

OTHER PUBLICATIONS

George Gilster; *High Accuracy Performance Capabilities of the Military Standard Ring Laser Gyro Inertial Navigation Unit*; Position Location and Navigation Symposium, Las Vegas, Nevada; 1994; pp. 464–473; IEEE New York, New York; XP010117767, ISBN 0–7803–1435–2.

C. Kerwin, R. Cnossen, C. Kiel, M. Lynch; *Development of a Tightly Integrated Ring Laser Gyro Based Navigation System*; 1998; pp. 545–552; IEEE XP 010078809.

* cited by examiner

Primary Examiner—Thomas G. Black
Assistant Examiner—Tuan L To
(74) Attorney, Agent, or Firm—Alston & Bird LLP (57) ABSTRACT

In accordance with this invention, an apparatus and method for aircraft navigation are provided that utilize a blended architecture consisting of a global positioning system (GPS) and micro-electromechanical sensors (MEMS) for the primary navigation system and a laser gyroscope system for the secondary navigation system. The blended architecture of the present invention provides a navigation system that is at least as accurate, redundant and fault-tolerant as conventional navigation systems. In addition, the navigation system components may be distributed throughout the aircraft and may share computing resources with other avionics systems to process signals and provide data to the avionics systems. Overall, the navigation system of the present invention is significantly less expensive and easier to maintain, but equally or more precise and redundant, relative to conventional navigation systems.

21 Claims, 3 Drawing Sheets

APPARATUS AND METHOD FOR NAVIGATION OF AN AIRCRAFT

FIELD OF THE INVENTION

This invention relates to aircraft navigation systems and, more particularly, to an apparatus and method for aircraft navigation that utilizes a blended architecture consisting of a global positioning system (GPS) and microelectromechanical sensors (MEMS) for the primary navigation system and a laser gyroscope system for the secondary navigation system.

BACKGROUND OF THE INVENTION

An aircraft navigation system is the source of data for many critical avionics functions, such as the primary flight control system, the flight deck displays, and guidance, control, and stabilization systems, including automatic landing systems. The navigation system measures a variety of parameters defining the state of the aircraft, such as attitude, heading, angular rates, acceleration, track angle, flight path angle, ground speed and position, and provides the data to the avionics systems for display and for use in the control of the aircraft's flight.

Commercial aircraft have generally relied upon inertial navigation. Inertial navigation requires that the navigation system be initialized at a starting position and provide autonomous and continuous measurements based on that reference. As such, inertial navigation systems are particularly useful for over-water navigation where it is more difficult to obtain ground references for the measurements. Most inertial navigation systems, however, are expensive and are subject to increases in position error, commonly called "drift," over time.

More particularly, most modern commercial aircraft are equipped with traditional or, less commonly, fault-tolerant Air Data Inertial Reference Units (ADIRU) to perform stand-alone inertial navigation and provide the necessary air data to the avionics systems. To ensure that navigational data is continuously provided during a flight, aircraft generally have more than one, typically three, traditional ADIRUs operating in parallel in a redundant arrangement, called a triplex configuration. Such traditional ADIRUs are used in the majority of large commercial aircraft. In this regard, those aircraft having Category 3B automatic landing capability require three ADIRUs, while the other navigational requirements can be minimally met with two ADIRUs. Alternatively, the most modern commercial aircraft may have a single, fault-tolerant ADIRU configuration that is constructed to be equivalent to three separate traditional ADIRUs. The single fault-tolerant ADIRU is constructed such that if any one component fails, the ADIRU remains operational, since the same ADIRU includes redundant components. In fact, the fault-tolerant ADIRU is generally constructed to remain operational even if any two components fail.

Each traditional ADIRU has three navigation-grade ring laser gyroscopes and three accelerometers. Therefore, a triplex configuration of the traditional ADIRUs has a total of nine navigation-grade ring laser gyroscopes and nine accelerometers. Each fault-tolerant ADIRU, on the other hand, has six navigation-grade ring laser gyroscopes and six accelerometers. The navigation-grade ring laser gyroscopes and accelerometers provide inertial navigation for the aircraft with a low amount of drift, typically less than 0.01 degree/hour, but they are expensive. All ADIRUs, traditional and fault-tolerant, require that the inertial measurements be obtained with great precision and that subsequent processing of those measurements maintain that precision. Thus, ADIRU processors generally have a complex and proprietary sensor interface to provide the precise timing, measurements and specialized features that are necessary. In addition, the processors and interfaces must generally be manufactured or provided by the same company that provided the sensors to ensure compatibility among the components of the ADIRU. ADIRUs are available from various vendors including the Honeywell HG2050 (traditional ADIRU) and HG2060 (fault-tolerant ADIRU) and the Litton (Northrop Grumman) LTN-101 (traditional ADIRU).

An aircraft equipped with a fault-tolerant ADIRU also carries a Secondary Attitude Air data Reference Unit (SAARU), which is a backup to the ADIRU in the rare event that the ADIRU malfunctions. This architecture is called a Fault-Tolerant Air Data Inertial Reference System (FT-ADIRS). The components of the SAARU are intentionally dissimilar to the ADIRU to preclude common failures in both units. That is, the SAARU generally will not include ring laser gyroscopes if the ADIRU includes ring laser gyroscopes. The SAARU may have four attitude-grade fiber optic gyroscopes. The fiber optic gyroscopes provide the necessary dissimilar design, but suffer from a higher amount of drift than the laser gyroscopes of the ADIRU with the drift generally being several degrees/hour. In addition, fiber optic gyroscopes are also costly. Like the laser gyroscopes of the ADIRU, the fiber optic gyroscope configuration of the SAARU requires its own processors, power supplies, input/output modules and proprietary interface to process signals, which also increases the cost of the SAARU. Furthermore, the SAARU is not fault-tolerant, so it must be fully functional before aircraft operation to ensure the availability of this backup unit.

Figure 1:
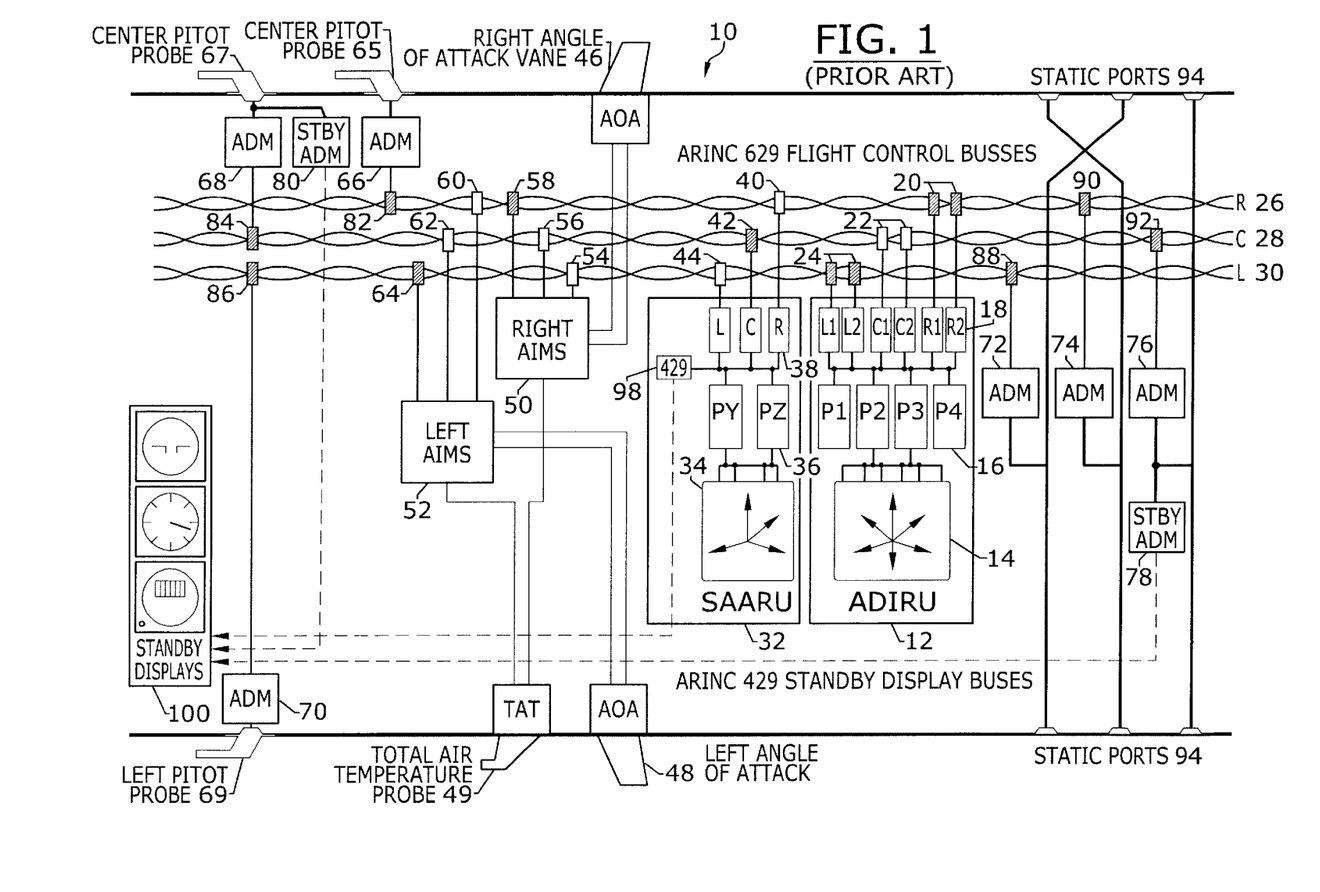
FIG. 1 illustrates a conventional inertial navigation system having a single, fault-tolerant ADIRU and a backup SAARU.

By way of example, FIG. 1 depicts a conventional FT-ADIRS architecture, located in the forward electrical/electronics bay of a Boeing 777 aircraft, with a single, fault-tolerant ADIRU 12. The ADIRU 12 has six ring laser gyroscopes and six accelerometers designated generally as 14 and four processors 16 (P1–P4) to process the signals from the gyroscopes and accelerometers 14. The processors 16 communicate with other avionics systems via the flight control buses, which generally include a right flight control bus 26, a center flight control bus 28 and a left flight control bus 30. The three flight control buses conform to ARINC standard 629 and are high-speed, two-way data buses that are shared by all subscribing ARINC 629 input/output (I/O) terminals attached to them. The I/O modules in the fault-tolerant ADIRU serve to receive air data sensor inputs and to transmit the entire suite of inertial and air data state signals to user avionics systems, such as flight instruments, flight management, automatic pilot controls and primary flight controls. Since signals may be transmitted both to and from the ADIRU 12 via the right 26 and left 30 flight control bus, transceivers 20, 24 are generally disposed between the respective input/output modules 18 and the right 26 and left 30 flight control bus. In contrast, since signals are generally received by the ADIRU 12 from the center flight control bus 28, a receiver 22 is generally disposed between the respective input/output modules 18 and the center flight control bus 28. To provide the desired redundancy, the ADIRU 12 generally includes multiple redundant processors 16, at least two input/output modules 18 associated with each flight control bus 26, 28, 30 and at least two transceivers or receivers 20, 22, 24 in communication with the respective flight control bus.

FIG. 1 also shows the backup SAARU 32 with components that are dissimilar to the components of the ADIRU 12. The SAARU 32 has four fiber optic gyroscopes 34 and two processors 36 (PY, PZ) to process the signals from the gyroscopes 34. The SAARU 32 also includes multiple input/output modules 38, one of which is associated with each flight control bus 26, 28, 30. The respective input/output modules 38 are, in turn, connected to the right 26 and left 30 flight control bus by respective receivers 40, 44 and to the center flight control bus 28 by a transceiver 42.

The flight control buses are also connected to the left Aircraft Information Management System (AIMS) 52 and the right AIMS 50. The left AIMS 52 is generally connected to the left flight control bus 30 by a transceiver 64 and to the center 28 and right 26 flight control bus by a receiver 60, 62. Conversely, the right AIMS 50 is generally connected to the right flight control bus 26 by a transceiver 58 and to the left 30 and center 28 flight control bus by a receiver 54, 56. As FIG. 1 illustrates, the left AIMS 52 is connected to and receives data from the Total Air Temperature (TAT) probe 49 and the left Angle Of Attack (AOA) vane 48. The right AIMS 50 is also connected to and receives information from the TAT probe 49 and the right AOA vane 46. Thus, the right and left AIMS 50, 52 provide an interface by converting the analog outputs of the AOA vane 48 and TAT probe 49 to digital signals for transmission to the ADIRU 12 and SAARU 32 via the flight control buses.

In addition, the flight control buses are connected to six primary air data modules (ADM). These modules measure the total and static pressure associated with the air surrounding the aircraft and provide signals to the ADIRU 12 and SAARU 32 via the flight control buses. ADM 68 measures total pressure from the center pitot probe 67 with ADM 68 being connected directly to the center flight control bus 28 by a transceiver 84. As known to those skilled in the art, a pitot probe generally measures total pressure. ADM 70 similarly measures total pressure from the left pitot probe 69 and is connected directly to the left flight control bus 30 by a transceiver 86. Likewise, ADM 66 measures total pressure from the right pitot probe 65 and connects to the right flight control bus 26 by a transceiver 82. ADM 72, 74, 76 and STBY ADM 78 also measure the static pressure via static ports 94. ADM 72 is, in turn, connected to the left flight control bus 30 by transceiver 88, ADM 74 is connected to the right flight control bus 26 by transceiver 90, and ADM 76 is connected to the center flight control bus 28 by transceiver 92.

In addition to the flight control bus, standby display buses are also depicted in FIG. 1 as dashed lines that provide information to the standby displays 100 in the rare event the primary displays or the ARINC 629 flight control buses malfunction. The standby display buses conform to ARINC standard 429 and connect the SAARU 32 and STBY ADMs 78 and 80 to the standby displays 100. The ARINC 429 bus provides a means dissimilar to the ARINC 629 bus for transmitting critical attitude data from the SAARU 32, through the 429 module 98, to the standby attitude display that also is dissimilar to the primary displays.

As a further consideration, both the ADIRU and SAARU are capable of measuring the aircraft's pitch rate. The ADIRU and SAARU pitch rate measurements, however, may not be suitable for the primary flight control system because the ADIRU and SAARU are located in the forward electrical/electronics bay of the aircraft, which is also subject to the aircraft's longitudinal bending modes. Because of their location, the ADIRU and SAARU measurements of the aircraft pitch rate contain an unacceptably high level of signal representing the motion associated with the aircraft's longitudinal bending modes, creating unsuitable pitch rate measurements. Thus, to provide the primary flight control system with suitable pitch rate measurements that are relatively free of longitudinal bending motion, four additional pitch rate sensors are installed at the wing main spar which experiences much less structural bending motion.

As will be apparent, the FT-ADIRS suite, containing the fault-tolerant ADIRU, SAARU, six primary air data modules, two standby air data modules, and four additional pitch rate sensors is expensive, often costing more than $200,000. As a result of the significant cost of a conventional commercial aircraft inertial navigation system, there exists a need in the aircraft industry for a much less expensive, but equally or more precise and redundant, navigation system. In addition, the industry would benefit greatly from a navigation system created by a relatively simple combination of components that does not require dedicated processors that communicate via a proprietary interface.

SUMMARY OF THE INVENTION

In accordance with this invention, an apparatus and method for navigation of an aircraft are provided that utilize a blended architecture having a global positioning system (GPS) and micro-electromechanical sensors (MEMS) for the redundant, primary navigation system and a laser gyroscope system for the secondary navigation system. The structure of the navigation system of the present invention provides a relatively low-cost navigation system because GPS and MEMS components are less expensive than the laser gyroscopes and accelerometers that are utilized in the conventional inertial navigation systems, such as the FT-ADIRS, utilized by commercial aircraft. Although the present invention utilizes laser gyroscopes in the secondary navigation system, fewer laser gyroscopes are necessary for a secondary navigation- system than in conventional navigation systems. The navigation system of the present invention may also have a lower cost because the primary navigation system does not require a proprietary sensor interface and may share processing resources with other avionics systems, unlike conventional systems that have a proprietary sensor interface and require dedicated processors. In addition, the primary navigation system of the present invention need not be centralized and may be distributed throughout the aircraft at the optimal locations for the respective components, such that the primary navigation system may measure angular rates, such as the pitch rate, and accelerations from locations in the aircraft that are optimal for the type of measurement at issue. This eliminates the cost of extra components that are necessary to measure the pitch rate in a conventional navigation system. Overall, the navigation system of the present invention is significantly less expensive and easier to maintain than the conventional navigation systems utilized by commercial aircraft because the components cost less and supporting systems may be shared with other avionics systems.

According to the present invention, the apparatus for navigation of an aircraft comprises a primary navigation system and a secondary navigation system. The primary system may have redundant global positioning system (GPS) receivers to provide signals indicative of a position of the aircraft and redundant micro-electromechanical sensors (MEMS) to perform inertial referencing of the aircraft. The GPS receivers may also determine the heading of the aircraft. The MEMS may include MEMS rate sensors and MEMS accelerometers. The secondary navigation system may be a single laser gyroscope system, typically including three ring laser gyroscopes and three navigation-grade accelerometers, that continuously performs inertial referencing of the aircraft and produces purely inertial navigation signals. The output of the primary navigation system is utilized to provide the necessary data to all of the avionics systems. However, the signals provided by the secondary navigation system may be utilized in the rare event the redundant primary navigation system completely malfunctions. By typically including only a single traditional ADIRU and instead relying primarily upon redundant GPS and the MEMS sensors, the apparatus of the present invention is more economical.

The apparatus of the present invention may also include a general-purpose computer that supports the primary navigation system in addition to other avionics systems. The general-purpose computer may have redundant processors. The apparatus of this embodiment also significantly reduces the price of an aircraft navigation system because a dedicated computer is not required to process the signals from the primary navigation system, unlike the conventional inertial navigation systems for commercial aircraft that require dedicated processors to provide the necessary precision. Moreover, since the primary navigation system does not rely upon the precision offered by ring laser gyroscopes, the apparatus of the present invention also need not include the complex and proprietary interface included within conventional navigation systems for commercial aircraft.

The MEMS rate sensors and MEMS accelerometers may be distributed throughout the aircraft. The MEMS rate sensors and MEMS accelerometers may be distributed in clusters of three MEMS rate sensors and three MEMS accelerometers. Since each MEMS rate sensor may provide an output based upon motion of the aircraft in a respective direction, the clusters of three MEMS rate sensors may be mounted such that the directions in which the respective MEMS rate sensors sense motion of the aircraft are mutually orthogonal. Likewise, since each MEMS accelerometer may provide an output based upon motion of the aircraft in a respective direction, the clusters of three MEMS accelerometers may be mounted such that the directions in which the respective MEMS accelerometers sense motion of the aircraft are mutually orthogonal. In a further embodiment of the present invention, the three MEMS rate sensors of a cluster may be mounted such that each senses motion of the aircraft along a respective one of the three, mutually orthogonal principle axes of the aircraft. In the same way, the three MEMS accelerometers of a cluster may be mounted such that each senses motion of the aircraft along a respective one of the three, mutually orthogonal principle axes of the aircraft. This distributed arrangement of the MEMS sensors is advantageous since the clusters may be placed in locations where the most suitable measurements will be obtained for use by the avionics systems, for example the primary flight control system. This is a significant improvement over the conventional approach of housing the FT-ADIRS entirely within the forward electrical/electronics bay of the aircraft and then installing additional sensors at the main wing spar to measure the pitch rate of the aircraft.

In an embodiment of the method of the present invention, a primary navigation system having redundant GPS and MEMS sensors and a secondary navigation system having a single laser gyroscope system are initially provided. During flight, the GPS may then provide signals indicative of, among other things, the position, groundspeed and the heading of the aircraft and the MEMS sensors may provide signals indicative of inertial motion of the aircraft. According to the method of the present invention, the aircraft is navigated, guided and controlled based upon the signals provided by the GPS and MEMS sensors so long as the GPS and MEMS sensors are operational. The signals provided by the redundant GPS and MEMS sensors may be consolidated and blended in a suitable filter to derive a single suite of high-integrity navigation data for use in the avionics systems. In the rare event the redundant primary navigation system completely malfunctions, the aircraft may be navigated, guided and controlled based upon signals from the laser gyroscope system indicative of the inertial motion of the aircraft.

Thus, the apparatus and method of the present invention provides the industry with a less expensive, but equally or more precise and redundant, navigation system relative to the conventional navigation systems utilized by commercial aircraft. The industry will benefit greatly from the primary navigation system of the present invention created by a combination of low-cost GPS and MEMS components that do not require dedicated processors or a proprietary interface. Although a conventional gyroscope configuration is utilized for the secondary navigation system, the overall design of the navigation system of the present invention nevertheless decreases the cost because fewer expensive gyroscopes, accelerometers and dedicated processors are necessary. Thus, the industry need for a navigation system with components that may be distributed throughout the aircraft and that may share computing resources with other avionics systems to process signals and provide data to the avionics systems is met by the present invention.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to one embodiment of the present invention, an apparatus for navigation of an aircraft is provided that utilizes a blended architecture consisting of redundant global positioning system (GPS) receivers and redundant microelectromechanical sensors (MEMS) for the primary navigation system and a single laser gyroscope system for the secondary navigation system. The structure of the navigation system of the present invention provides a reduction in cost, but equal or greater precision and redundancy, than a conventional redundant inertial navigation system for commercial aircraft for several reasons. In this regard, the blending of GPS receivers and MEMS sensors provides navigational data with at least as much, if not more, precision and redundancy than the conventional navigation systems, such as the ADIRS depicted in FIG. 1, but at a fraction of the cost. In addition, the GPS and MEMS structure is capable of sharing computer hardware resources with other avionics systems and does not require dedicated processors or a proprietary interface to perform the necessary computations and to communicate with other avionics systems. Further, by utilizing a single laser gyroscope secondary navigation system with components that are dissimilar to those of the primary GPS/MEMS system, the apparatus of the present invention provides both the desired redundancy and fault tolerance in a manner that mitigates common-mode failures. By generally including only a single traditional ADIRU with three ring laser gyroscopes as the secondary system, however, the apparatus of the present invention remains less expensive than conventional navigation systems having six or more ring laser gyroscopes.

Figure 2:
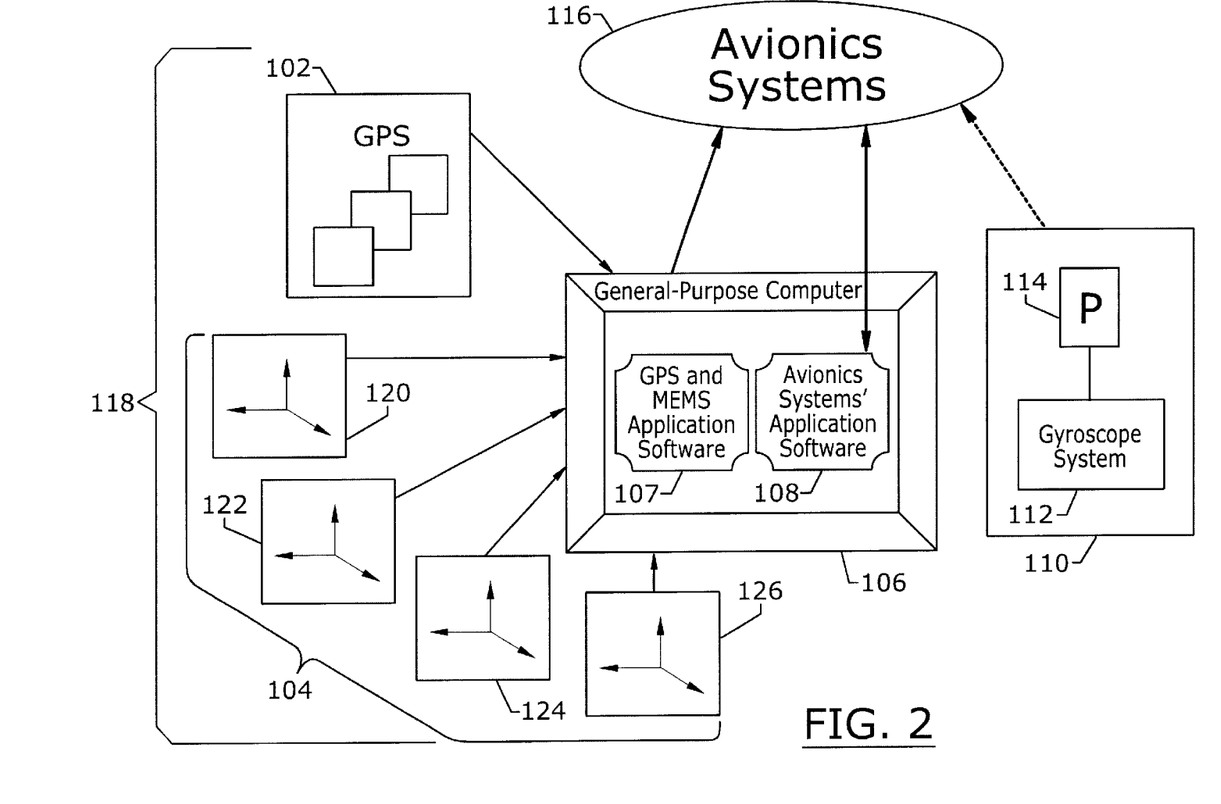
FIG. 2 is a block diagram representation of one embodiment of the present invention depicting a primary navigation system having a blended architecture consisting of GPS and MEMS sensors and a secondary navigation system having laser gyroscopes.

FIG. 2 is a block diagram representation of one embodiment of the present invention depicting a primary navigation system 118 including redundant GPS receivers and MEMS sensors and a secondary navigation system 110, typically including three ring laser gyroscopes and three navigation-grade accelerometers. The GPS receivers 102 provide positional data that serves as a long-term navigation reference, while the MEMS sensors 104 provide the short-term inertial reference. The signals from the redundant GPS receivers 102 and the redundant MEMS sensors 104 may be consolidated to obtain a single set of high-integrity GPS and MEMS data in any manner known to those skilled in the art. For example, the signals from the redundant GPS receivers 102 and the redundant MEMS sensors 104 may be received by the redundant general-purpose processors, then consolidated by voting and monitoring to isolate failed receivers or sensors and to obtain a single set of high-integrity GPS and MEMs sensor data. The resulting GPS and MEMS data are then blended by a Kalman filter to generate, for example, aircraft angular rates, accelerations, attitude, heading, track angle, flight path angle, groundspeed and position. As an alternative example, the signals from each GPS receiver 102 may be blended with the data from a single MEMS sensor cluster by a Kalman filter, and the resulting redundant suites of navigation data may be consolidated to produce a single suite of high-integrity navigation data. The process of blending sensor data, such as the data provided by the GPS and MEMS sensors, with a Kalman filter is well-known and will not be described here. The Kalman filter process is described in detail in a number of textbooks, one example is A. Gelb, ed., Applied Optimal Estimation, The Analytical Sciences Corporation, The M.I.T. Press, Cambridge, Mass., 1974.

The GPS 102 of the present invention includes a GPS receiver and an associated processor for receiving and processing signals from a constellation of satellites to determine the latitude and longitude position of the GPS and, in turn, the aircraft at any time. The GPS 102 may be configured in a variety of manners to ensure the GPS is fault-tolerant. One example is to configure the GPS 102 to have three receivers such that if one receiver malfunctions, the GPS 102 is, however, fully fail-operational and if two receivers malfunction, the GPS 102 is nevertheless fully fail-passive.

The embodiment of the GPS 102 of the present invention that includes two or more GPS antennas is capable of determining the heading of the aircraft. To determine the heading of the aircraft from the GPS 102, each GPS receiver uses inputs from two antennas to make a differential carrier-phase position measurement. An initial heading determination is made while the aircraft is parked and close to level. The subsequent heading measurements are generally accurate to one degree as long as the antennas are separated by a few feet. If the antennas of the GPS 102 are shadowed during flight, during banked turns for example, and cannot observe sufficient satellites either to determine position or to make the differential carrier phase heading measurement, then the Kalman filter may temporarily resort to using only the MEMS sensors 104. Thus, for many minutes, the MEMS sensors 104 alone can provide coasting capability to ensure uninterrupted attitude and heading measurements until the GPS antennas can resume proper function. If the entire primary navigation system 118 malfunctions, then the ring laser gyroscope system 112 of the secondary navigation system 110 is capable of determining aircraft heading, attitude and navigation indefinitely or until the primary navigation system resumes proper function. The primary navigation system of the present invention may utilize any GPS certified for primary aircraft navigation and known to those skilled in the art. For example, the Litton LTN-2012 or Rockwell Collins GPS-4000A or similar systems may be used.

Because the GPS accurately determines the position of the aircraft, the precision provided by ring laser gyroscopes is not required, and the ring laser gyroscopes of conventional designs may be replaced with less precise inertial sensors. One example of suitable inertial sensors is the MEMS sensors known to those skilled in the art. MEMS sensors may be fabricated by laser micro-machining silicon or quartz to create sensors of very small (0.2–0.5 inch) dimensions. These MEMS sensors may typically have a short-term drift stability of 1.0 to 10 degree/hour. Several manufacturers produce MEMS that may be utilized for inertial sensors, for example the BEI Systron-Donner QRS 11 rate sensor and VQA accelerometer. Constructing the primary navigation system with MEMS sensors dramatically reduces the cost of the navigation system since MEMS rate sensors are typically ten to twenty percent of the cost of a ring laser gyroscope.

The MEMS sensors 104 include MEMS angular rate sensors and MEMS accelerometers. Each MEMS angular rate sensor and each MEMS accelerometer provides an output based upon motion of the aircraft in a respective direction. The MEMS angular rate sensors and MEMS accelerometers may be distributed in a plurality of clusters throughout the aircraft. For example, the MEMS angular rate sensors and the MEMS accelerometers may be distributed in four clusters 120, 122, 124, and 126 throughout the aircraft. By way of a more particular example, the clusters may be located on or near the wing main spar where the structural bending motion of the aircraft is minimized, such that the MEMS angular rate sensors and MEMS accelerometers sense motion of the aircraft with the least amount of interference from the structural bending motion of the aircraft. Thus, because the clusters of MEMS sensors are located where the structural bending of the aircraft is minimized, the angular rate, including pitch rate, and acceleration measurements are suitable for use by the avionics systems 116, for example by the primary flight control system. The ability to distribute the clusters of MEMS angular rate sensors and MEMS accelerometers therefore eliminates the need in the conventional approach to purchase and install separate pitch rate sensors.

Furthermore, each cluster 120, 122, 124, and 126 may contain three MEMS angular rate sensors mounted in a mutually orthogonal configuration to sense motion of the aircraft in mutually orthogonal directions. Likewise, each cluster 120, 122, 124, and 126 may contain three MEMS accelerometers mounted in a mutually orthogonal configuration to sense motion of the aircraft in mutually orthogonal directions. In further embodiments of the present invention, the clusters 120, 122, 124, and 126 may be mounted such that each of the three MEMS angular rate sensors and each of the three MEMS accelerometers senses motion of the aircraft along a respective axis of the aircraft's three, mutually orthogonal principle axes.

FIG. 2 also depicts the manner in which the primary navigation system 118 is capable of sharing a general-purpose computer 106 with selected avionics systems 116 of the aircraft. Applications software associated with any of the aircraft's avionics systems may potentially share the general-purpose computer 106. The avionics systems that actually use the output data from the primary navigation system application software 107 may be, but are not necessarily, the same ones whose software shares the general-purpose computer 106. The general-purpose computer 106 processes the signals from the GPS 102 indicative of the position of the aircraft and the signals from the MEMS sensors 104 indicative of the inertial motion of the aircraft, computes the blended GPS/MEMS navigation data, and provides that data to the appropriate avionics systems 116. Thus, the general-purpose computer 106 contains MEMS and GPS navigation system application software 107 to process the signals received from the MEMS sensors 104 and GPS 102, in addition to other avionics systems application software 108 to process the signals transmitted to and from the avionics systems 116. In addition, because any other system that requires a processor may also use the general-purpose computer 106, the general-purpose computer 106 may also contain application software associated with those systems. Sharing a computer with the avionics systems and any other system of the aircraft reduces the cost of the primary navigation system of the present invention compared to the conventional navigation systems that require dedicated processors or computers. The primary navigation system can share computer resources since, among other reasons, the MEMS sensors require less precision in their measurements than the gyroscopes and accelerometers of the conventional systems. For at least this same reason, the primary navigation system of the present invention does not require the proprietary interfaces needed by conventional systems and, instead, can utilize more common, standard, and less expensive interfaces having an open architecture.

The primary navigation system provides navigational signals to the avionics systems for display and for use in the guidance, control and stabilization of the aircraft, including auto-landing of the aircraft. Although it is very unlikely that the primary navigation system will fail due, among other reasons, to the reliability of the components and the redundancy of the system, the secondary navigation system is provided to supply the necessary navigational information in the event of the failure of the primary navigation system. The secondary navigation system may serve as the backup source of data for at least the following functions: overwater navigation; attitude and heading for flight-deck displays; precision guidance for completion of a GPS-guided auto-land; and angular rates, accelerations, and attitude for flight controls.

The secondary navigation system 110 of the present invention is also shown in FIG. 2. The secondary navigation system 110 also continuously performs inertial referencing of the aircraft and produces navigation signals that are utilized by the avionics systems 116 in the event the primary navigation system malfunctions. The secondary navigation system 110 of the present invention may include a single, traditional laser air data inertial reference unit (ADIRU) having three ring laser gyroscopes as the gyroscope system 112 and at least one processor 114 to process the signals provided by the gyroscopes, for example a Boeing 737NG-type conventional ADIRU. As described above in conjunction with conventional navigation systems, the secondary navigation system 110 also generally includes a proprietary interface for facilitating internal communication between the processor 114 and the gyroscope system 112. The ring laser gyroscopes 112 may be any type known to one skilled in the art that performs inertial referencing and produces navigation signals. For example, the Honeywell GG 1320 gyroscope may be used. While a ring laser gyroscope system 112 is relatively expensive, the cost of the apparatus of the present invention is minimized by typically including only one ring laser gyroscope system, which provides the necessary navigational information in the event that the primary navigation system fails.

Figure 3:
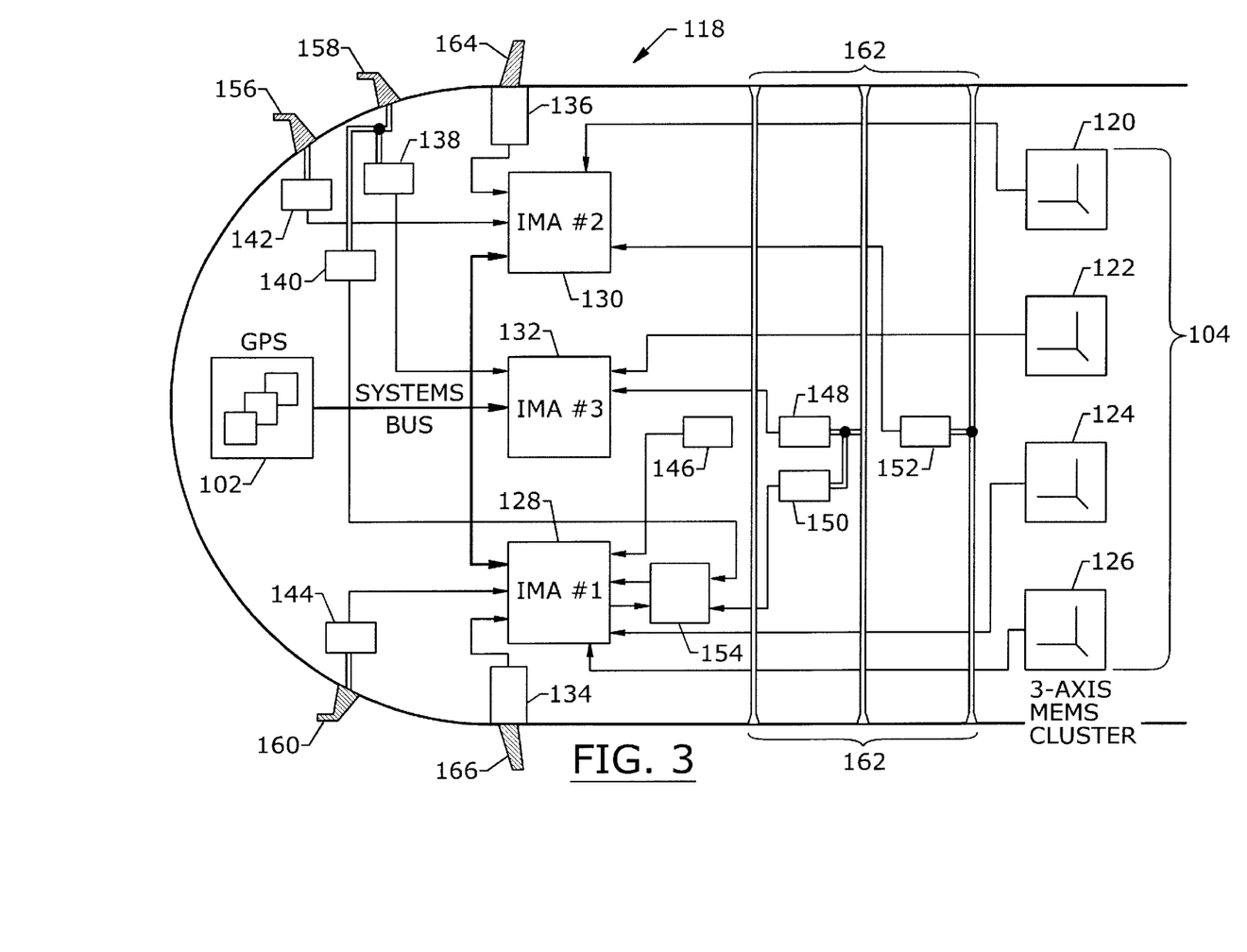
FIG. 3 is a detailed representation of the primary navigation system of one embodiment of the present invention.

FIG. 3 is a detailed representation of the primary navigation system 118 of one embodiment of the present invention. As schematically depicted, the primary navigation system 118 may include multiple GPS receivers 102 and multiple clusters of MEMS sensors 104, typically distributed throughout the aircraft such as along the main wing spar. Signals provided by the GPS 102 and the MEMS sensors 104 are supplied to the Integrated Modular Avionics (IMA) cabinets 128, 130, and 132. The IMA cabinets 128, 130, and 132 contain the general-purpose computer 106 having general-purpose core processor modules that are shared with other avionics systems. Each core processor module is a high integrity computer platform and may contain redundant processors to ensure containment of component faults. The IMA cabinets 128, 130, and 132 also contain shared general-purpose input/output modules and power supply modules. The input/output modules receive the GPS and MEMS data inputs and transmit the processed outputs onto the systems bus for receipt by the avionics and other systems.

The input/output modules of the MA cabinets 128, 130, and 132 also receive air data and angle of attack inputs from the Air Data Modules (ADM) and Angle Of Attack (AOA) modules. The embodiment of the present invention depicted in FIG. 3 has six ADMs, two STBY ADMs, and two AOAs, although other configurations may have other numbers of these modules. ADMs 142, 138, and 144 measure the right, center, and left air pressure, respectively, from pitot probes 156, 158, and 160 on the outside of the aircraft. STBY ADM 140 is a backup ADM to measure the center total air pressure and provide it to the secondary ADIRU 154. Similarly, ADMs 146, 148, and 152 measure the left, center, and right static air pressure, respectively, from static ports 162. STBY ADM 150 is a backup ADM to measure the center static air pressure and provide it to the secondary ADIRU 154. AOA modules 136 and 134 measure the right and left angle of attack, respectively, of the aircraft from the AOA vanes 164 and 166. The air data and angle of attack data is supplied to the IMA cabinets 128, 130, and 132 where it is processed along with the data provided by the GPS 102 and MEMS sensors 104 prior to transmission along the systems bus to the avionics systems.

The apparatus of FIG. 3 also includes a secondary ADIRU 154 that receives information from the STBY ADMs 150 and 140. The secondary ADIRU 154 also receives and transmits attitude and navigation information from and to IMA cabinet 128 for continued avionics functions if the GPS 102 and/or the MEMS sensors 104 malfunction.

Overall, the primary navigation system 118 of the present invention comprising the GPS 102 and MEMS sensors 104 is at least as redundant and fault-tolerant as the conventional navigation system described above. The primary navigation system 118 is fully functional after any two component failures, while also including a secondary ADIRU 154. In addition,.the secondary navigation system's architecture and components are dissimilar to those of the primary navigation system of the present invention, which protects against common mode failures or errors in the primary and secondary navigation systems.

The primary navigation system 118 of the present invention is also equally or more accurate than conventional navigation systems. The navigation data, including position, groundspeed, track, and track-referenced accelerations, of the primary navigation system of the present invention is superior to that provided by conventional inertial navigation systems because of the precision provided by the GPS. Additionally, the accuracy of the attitude, heading, angular rates and accelerations measurements of the primary navigation system of the present invention are comparable to those provided by conventional inertial navigation systems. As described above, the apparatus of the present invention is also significantly less expensive than conventional navigation systems onboard commercial aircraft with a cost savings potential of $150,000 or more per aircraft.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for navigation of an aircraft, the apparatus comprising:

a primary navigation system having a global positioning system capable of providing signals indicative of a position of the aircraft and a plurality of micro-electromechanical sensors capable of performing inertial referencing of the aircraft, said plurality of micro-electromechanical sensors comprising a micro-electromechanical rate sensor and a micro-electromechanical accelerometer; and a secondary navigation system having a laser gyroscope system capable of performing inertial referencing of the aircraft and producing navigation signals utilized in the event the primary navigation system malfunctions.

2. The apparatus of claim 1, further comprising a general-purpose computer system for supporting the primary navigation system and a plurality of other avionics systems.

3. The apparatus of claim 2, wherein the general-purpose computer system has redundant processors.

4. The apparatus of claim 1, wherein said plurality of micro-electromechanical sensors comprise a plurality of micro-electromechanical rate sensors and a plurality of micro-electromechanical accelerometers distributed throughout the aircraft.

5. The apparatus of claim 4, wherein the plurality of micro-electromechanical rate sensors and the plurality of micro-electromechanical accelerometers are distributed in a plurality of clusters of three rate sensors and three accelerometers wherein each micro-electromechanical rate sensor provides an output based upon motion of the aircraft in a respective direction, wherein the three rate sensors of a cluster are mounted such that the directions in which the respective rate sensors sense motion of the aircraft are mutually orthogonal, wherein each micro-electromechanical accelerometer provides an output based upon motion of the aircraft in a respective direction, and wherein the three accelerometers of a cluster are mounted such that the directions in which the respective accelerometers sense motion of the aircraft are mutually orthogonal.

6. The apparatus of claim 5, wherein the aircraft has three, mutually orthogonal principle axes, wherein the three rate sensors of a cluster are mounted such that each rate sensor senses motion of the aircraft along a respective axis of the aircraft, and wherein the three accelerometers of a cluster are mounted such that each accelerometer senses motion of the aircraft along a respective axis of the aircraft.

7. The apparatus of claim 1, wherein said global positioning system is capable of determining heading of the aircraft.

8. The apparatus of claim 1, wherein said laser gyroscope system of said secondary navigation system has no more than three ring laser gyroscopes.

9. A method for navigating an aircraft, the method comprising:

providing a primary navigation system having a global positioning system and a plurality of micro-electromechanical sensors;

providing a secondary navigation system having a laser gyroscope system;

providing signals from the global positioning system indicative of a position of the aircraft;

providing signals from the micro-electromechanical sensors indicative of inertial motion of the aircraft;

navigating the aircraft based upon the signals provided by the global positioning system and the micro-electromechanical sensors; and navigating the aircraft based upon signals from the laser gyroscope system indicative of the inertial motion of the aircraft in the event the primary navigation system malfunctions.

10. The method of claim 9, further comprising processing the signals provided by the primary navigation system with a general-purpose computer system that also supports a plurality of other avionics system.

11. The method of claim 9, wherein providing signals from the micro-electromechanical sensors comprises providing signals from a plurality of micro-electromechanical rate sensors and a plurality of micro-electromechanical accelerometers distributed throughout the aircraft.

12. The method of claim 11, wherein providing signals from the micro-electromechanical sensors further comprises providing signals from a cluster of micro-electromechanical sensors arranged in a mutually orthogonal configuration.

13. The method of claim 12, wherein the aircraft has three, mutually orthogonal principle axes, wherein providing signals from the micro-electromechanical sensors further comprises providing signals from the cluster of micro-electromechanical sensors arranged to sense motion along the principle axes of the aircraft.

14. The method of claim 9, wherein providing signals from the global positioning system comprises providing a signal indicative of a heading of the aircraft.

15. The method of claim 9, wherein navigating the aircraft based upon the signals provided by the global positioning system and the micro-electromechanical sensors comprises blending the signals provided by the global positioning system and the micro-electromechanical sensors to derive inertial data for use in avionics systems.

16. An apparatus for navigation of an aircraft, the apparatus comprising:

a primary navigation system having a global positioning system capable of providing signals indicative of a position of the aircraft and a plurality of micro-electromechanical sensors capable of performing inertial referencing of the aircraft, said plurality of micro-electromechanical sensors comprising a plurality of micro-electromechanical rate sensors and a plurality of micro-electromechanical accelerometers distributed throughout the aircraft in a plurality of clusters of three rate sensors and three accelerometers; and a secondary navigation system having no more than three ring laser gyroscopes capable of performing inertial referencing of the aircraft and producing navigation signals utilized in the event the primary navigation system malfunctions.

17. The apparatus of claim 16, further comprising a general-purpose computer system for supporting the primary navigation system and a plurality of other avionics systems.

18. The apparatus of claim 17, wherein the general-purpose computer system has redundant processors.

19. The apparatus of claim 16, wherein each micro-electromechanical rate sensor of said plurality of micro-electromechanical sensors provides an output based upon motion of the aircraft in a respective direction, wherein the three rate sensors of a cluster are mounted such that the directions in which the respective rate sensors sense motion of the aircraft are mutually orthogonal, and wherein each micro-electromechanical accelerometer of said plurality of micro-electromechanical sensors provides an output based upon motion of the aircraft in a respective direction, wherein the three accelerometers of a cluster are mounted such that the directions in which the respective accelerometers sense motion of the aircraft are mutually orthogonal.

20. The apparatus of claim 19, wherein the aircraft has three, mutually orthogonal principle axes, wherein the three rate sensors of a cluster are mounted such that each rate sensor senses motion of the aircraft along a respective axis of the aircraft, and wherein the three accelerometers of a cluster are mounted such that each accelerometer senses motion of the aircraft along a respective axis of the aircraft.

21. The apparatus of claim 16, wherein said global positioning system is capable of determining heading of the aircraft.

* * * * *